June 15, 1926.

F. W. LANE ET AL

LET-OFF FOR LOOMS

Filed May 27, 1925

INVENTORS
Frederick W. Lane and
Felix Ramm
by Wilkinson & Giusta
ATTORNEYS.

Patented June 15, 1926.

1,589,181

UNITED STATES PATENT OFFICE.

FREDERICK W. LANE AND FELIX RAMM, OF PITTSFIELD, MAINE.

LET-OFF FOR LOOMS.

Application filed May 27, 1925. Serial No. 33,235.

This invention relates to let-offs for looms and has for one of its objects to provide a device of this character which will be simple in construction, comparatively inexpensive to manufacture and install and more efficient in use than those which have been heretofore proposed.

A further object of the invention is to provide a device of this character in which the weights commonly employed are eliminated; which will be small and compact so as to occupy less space than is necessary where weights are employed; and one in which the amount of friction exerted to control the movements of the warp beam may be readily adjusted to suit varying operating conditions.

With the above and other objects in view which will appear as the description proceeds, the invention consists in the novel details of construction and combinations of parts, more fully and hereinafter described and particularly pointed out in the appended claims.

Referring to the accompanying drawings, in which like reference characters designate like parts in all the views.

Figure 1:
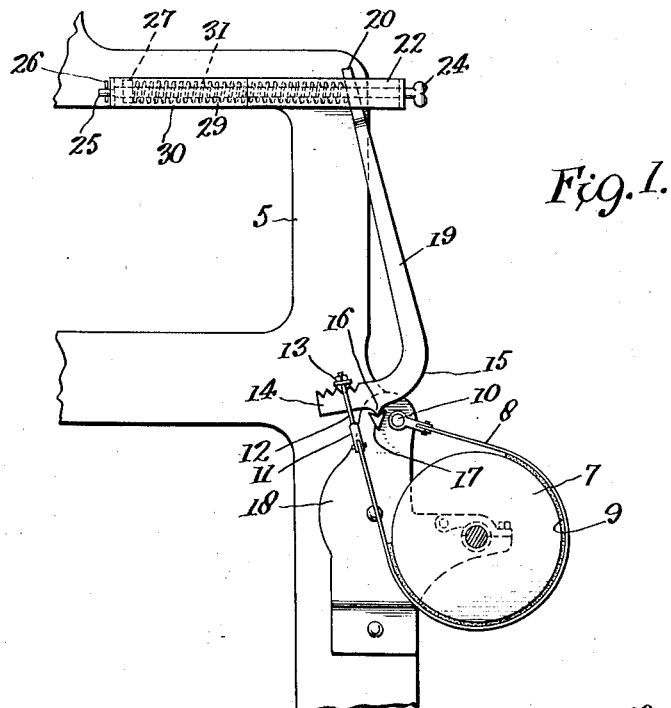
Fig. 1 is a side elevational view of a device constructed in accordance with the present invention, showing the same in operative position upon a portion of a loom frame.
Figure 3:
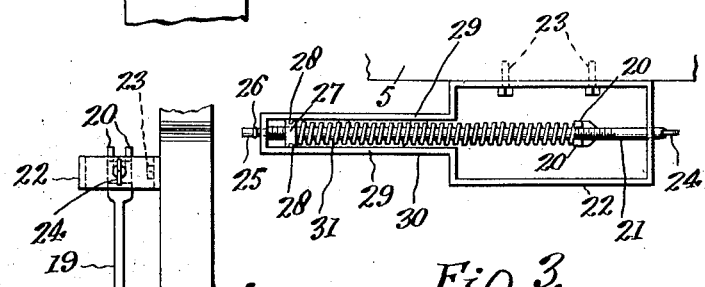
Figure 2:
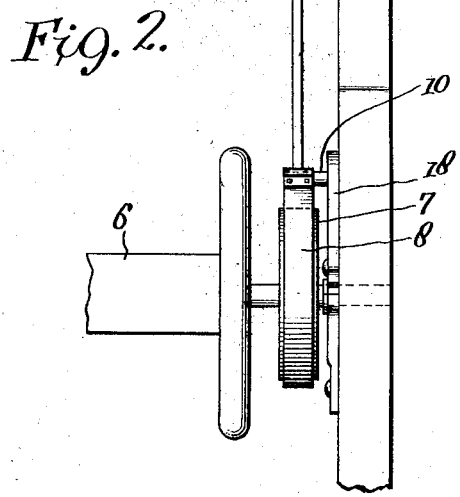
Fig. 2 is an end elevational view of the parts shown in Fig. 1 as seen from the right of the said figure; and, Fig. 3, is a top plan view of the let-off mechanism.

In the said drawings, the numeral 5 indicates a portion of a loom frame in which is suitably journaled the usual warp beam 6 which is provided with a friction brake drum 7. The said drum is partially surrounded by a brake band 8 having a suitable friction lining 9 and one end of the said band may be secured to a stud 10, carried by the beam stand. The other end of the brake band 8 is provided with a clip 11, having a stud 12 rigid therewith, which stud is preferably threaded to receive a nut 13 (see Fig. 1), which engages one arm 14 of the substantially L-shaped lever 15. The said lever 15, is preferably provided with a V-shaped lug 16 which is received in a similarly notched lug 17, provided on the beam stand 18, which is suitably secured to the loom frame 5.

The longer arm 19 of the L-shaped lever 15 extends upwardly substantially as shown, and its upper extremity is bifurcated as shown at 20 to straddle the threaded rod or screw 21 which is rotatably mounted in the substantially rectangular frame or bracket member 22 which is secured to the loom frame 5 as by the bolts 23.

One end of the said rod or screw 21 is provided with suitable wings 24 constituting finger pieces by means of which the screw may be manually rotated and the other end of the said rod is preferably reduced as indicated at 25 where it passes through the end wall of the frame member 22 and is provided with a cotter pin 26 for retaining the same in operative position. A nut 27 is threaded upon the screw 21 and the parts are so designed and assembled that opposed faces 28 of the said nut will engage the inner surfaces of the wall 29 of the reduced portion 30 of the frame 22, whereby rotation of the said nut will be prevented although longitudinal movement thereof will be permitted. A coiled compression spring 31 is interposed between the nut 27 and the bifurcated end 20 of the lever 15, the said spring surrounding the screw or rod 21 as will be readily understood from the drawings.

The operation of the device will be clear from the foregoing but it may be briefly summarized as follows:

The parts being in the positions illustrated in Fig. 1 for example, the spring 31 will tend to move the upper bifurcated end 20 of the lever 15 toward the right as viewed in the said figure, which will cause the said lever to pivot on its fulcrum 16 so as to raise the arm 14 thereof and thereby tend to move the stud 12 and the clip 11 which is secured to one end of the brake band end 8, upwardly and to thereby tighten the said band upon the brake drum 7. Should it be desired to increase the friction exerted by the brake band upon the drum 7, by manually turning the screw 21 in the proper direction to move the nut 27 toward the right as viewed in Fig. 1, the pressure of the spring 31 may be increased, with a consequent increase in the pressure exerted by the brake band upon the drum. On the other hand if it is desired to lessen the friction upon the brake drum by turning the screw 21 in the other direction, the nut 27 may be moved toward the left, thereby lessening the compression of the spring 31.

While one form of the invention has been illustrated and described, it is obvious that those skilled in the art may vary the details of construction as well as the precise arrangements of parts without departing from the spirit of the invention and, therefore, it is not wished to be limited to the above disclosure except as may be required by the claims.

What is claimed is:

1. In a device of the class described, a brake drum; a brake band adapted to frictionally engage said drum; a hollow substantially rectangular frame; a threaded rod rotatably mounted in said frame; a nut carried by said rod, said nut engaging a portion of said frame to prevent rotation thereof while permitting of longitudinal movement of the same; an L-shaped lever, one arm of which is connected to one end of said brake band, and the other arm of which is bifurcated to embrace said rod; and a coiled compression spring surrounding said rod between said nut and the bifurcated end of said lever arm.

2. The combination with a loom frame, a warp beam mounted therein, a brake drum carried by said beam, and a brake band embracing said drum and adapted to frictionally engage the same, of a hollow substantially rectangular frame member having a reduced portion secured to said loom frame; a rotatable threaded rod mounted in said frame member, and extending through said reduced portion; a nut carried by said rod with its faces engaging the surface of the walls of said reduced portion, whereby rotation of said nut is prevented while longitudinal movement thereof is permitted; an L-shaped lever fulcrumed on said loom frame, one arm of which is connected to one end of said brake band. and the other arm of which extends upwardly within said frame member, and is bifurcated to straddle said rod; and a coiled compression spring surrounding said rod between said nut and said last named lever arm.

FREDERICK W. LANE.
FELIX RAMM.